United States Patent [19]

Rogers

[11] Patent Number: 4,506,979

[45] Date of Patent: Mar. 26, 1985

[54] COMPACT RADIATION FRINGE VELOCIMETER FOR MEASURING IN THREE DIMENSIONS

[75] Inventor: Philip L. Rogers, Granada Hills, Calif.

[73] Assignee: Lockheed Corporation, Burbank, Calif.

[21] Appl. No.: 328,721

[22] Filed: Dec. 8, 1981

[51] Int. Cl.³ ............................ G01P 3/36; G01J 3/30
[52] U.S. Cl. .................................. 356/28.5; 356/318
[58] Field of Search ............................. 356/28.5, 318

[56] References Cited

U.S. PATENT DOCUMENTS

| | | |
|---|---|---|
| 3,744,910 | 7/1973 | Van Deelan . |
| 3,915,572 | 10/1975 | Orloff . |
| 3,966,324 | 6/1976 | Iten . |
| 3,984,685 | 10/1976 | Fletcher et al. ................... 250/339 |
| 4,148,585 | 4/1979 | Bargeron et al. ................. 356/28.5 |
| 4,167,329 | 9/1979 | Jelalian et al. ........................ 356/5 |
| 4,168,906 | 9/1979 | Schwiesow .......................... 356/28 |
| 4,179,218 | 12/1979 | Erdmann et al. .................. 356/336 |

FOREIGN PATENT DOCUMENTS 1524830 9/1978 United Kingdom .

OTHER PUBLICATIONS

R. M. Huffaker, Applied Optics, May 1970, "Laser Doppler Velocimeter Detection Systems for Gas Velocity Measurements".
C. A. Greated et al., Electro-Optics '71 International Conference; Brighton, England; Mar. 1971.
J. D. Trolinger, NATO Agar #186, Mar. 1974, "Laser Instrumentation for Field Flow Diagnostics".
V. M. Kulybin, Soviet Physics Journal, Oct. 1975, p. 1425, "Three-Component Optical Doppler Anemometer".
Research Disclosure #14125; Jan. 1976, (Industrial Opportunities, Ltd. of Homewell, Eng.); "Holographic Velocimeter".

R. N. Dubnistchev et al., Optics & Laser Tech., Jun. 1976, p. 129.
A. Boutier et al., IEEE Transactions on Aerospace & Electronics Sys., p. 441, May 1978.
T. Sato et al., Applied Optics, Dec. 15, 1978, p. 3890.
J. W. Bilbro, Optical Eng., Jul./Aug. 1980, p. 4.
Yanta, ICIASF '79 Record, Monterey, CA. (Sep. 24–26, 1979).
Hallermeier, Appl. Optics, vol. 12, No. 2, Feb. 1973.
Bossel et al., J. Phys. E (GB), vol. 5, No. 9, (Sep. 1972).
Vasilenko et al., Opt. Spectrosc., vol. 41, No. 1, Jul. 1976.

Primary Examiner—S. C. Buczinski
Attorney, Agent, or Firm—Frederic P. Smith

[57] ABSTRACT

A uniquely configured radiation fringe velocimeter is used to measure all three components of velocity remotely from a single point. The device is particularly intended for utilization aboard an aircraft, in which case the velocity being measured may be that of aerosol particles or other scattering centers in the free airstream at a location spaced apart from the surface of the aircraft and thus for the most part, free from any associated turbulence effects, etc. The device utilizes known optical techniques for splitting and modulating coherent light into three beam pairs focused onto a common detection volume such that three sets of three-dimensional fringe plane patterns are formed at the detection volume, each of the three sets being aligned along a different fringe plane normal vector and moving in the direction of the corresponding fringe plane normal vector at a different predetermined apparent velocity and-/or fringe spacing whereby each of the three different sets of fringe patterns will modulate the intensity of the radiation scattered by an aerosol particle at a fixed location within the detection volume with a characteristic modulation frequency. The beams are oriented with respect to one another at the detection volume such that no two of the three normal vectors associated with the three sets of fringe planes are mutually orthogonal and that all three do not all lie on the same plane.

19 Claims, 10 Drawing Figures

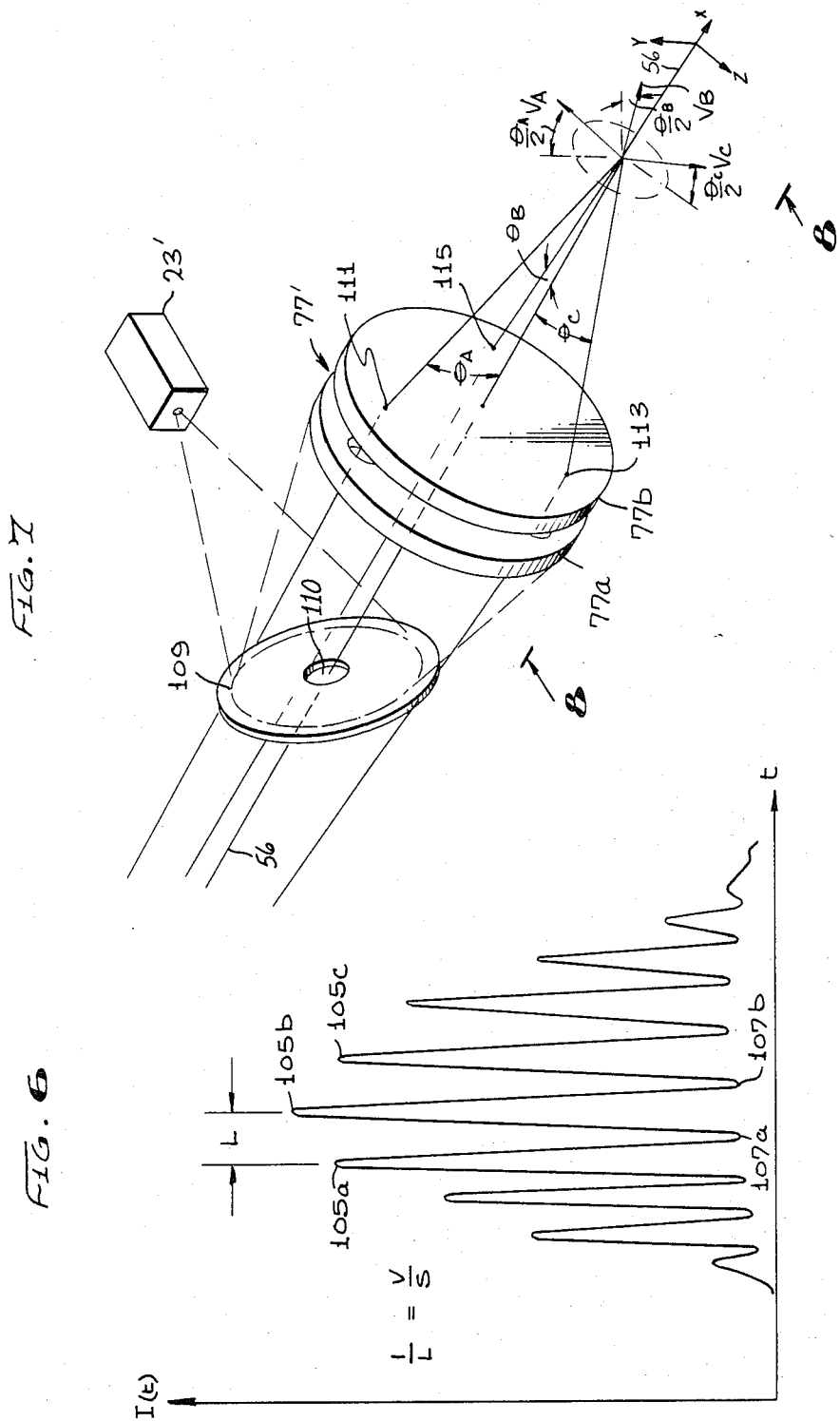

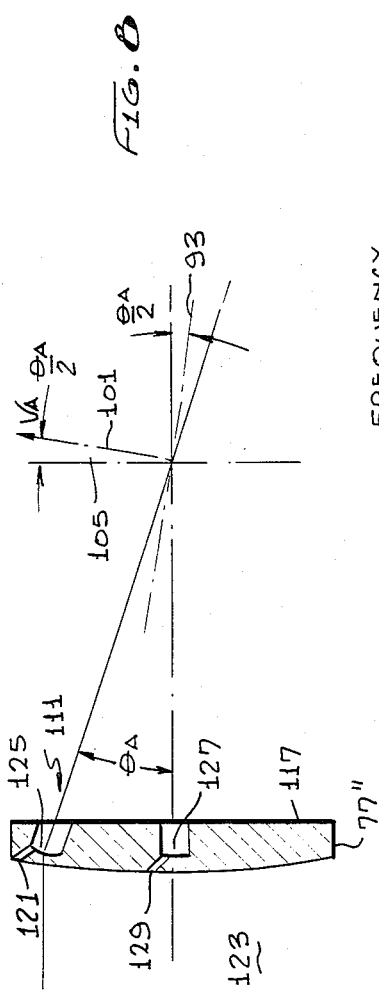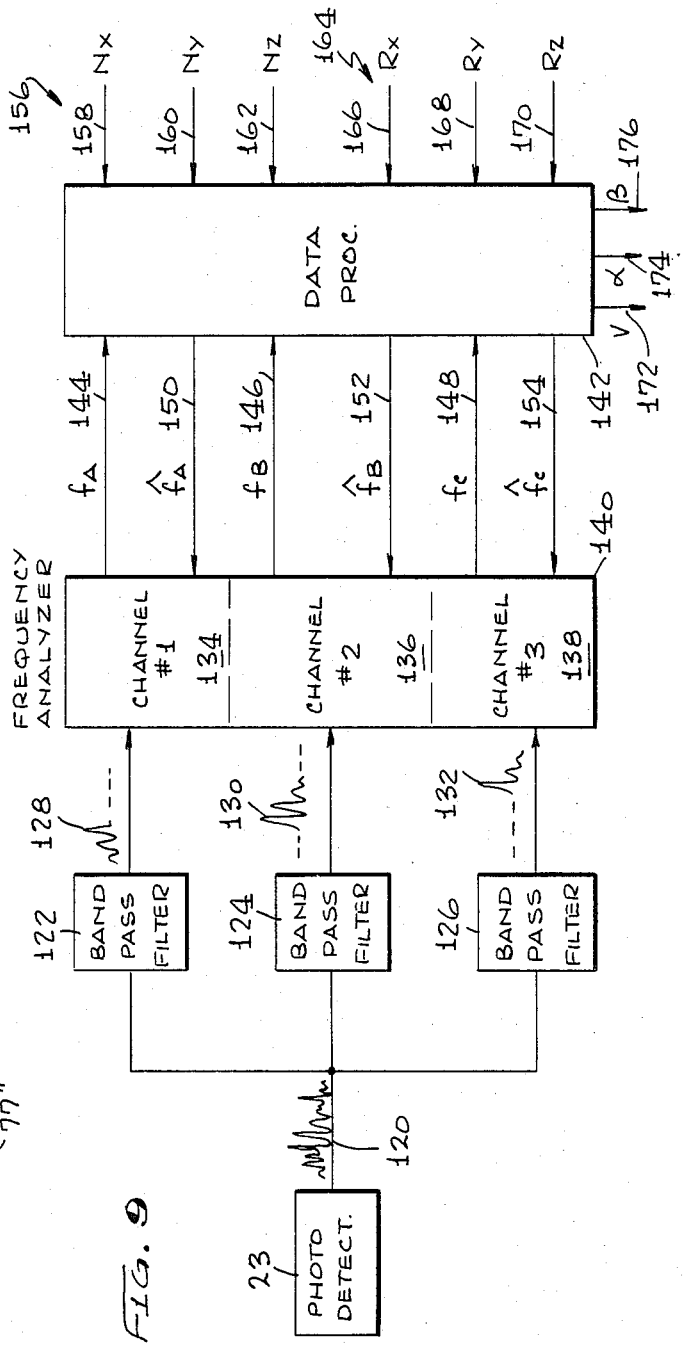

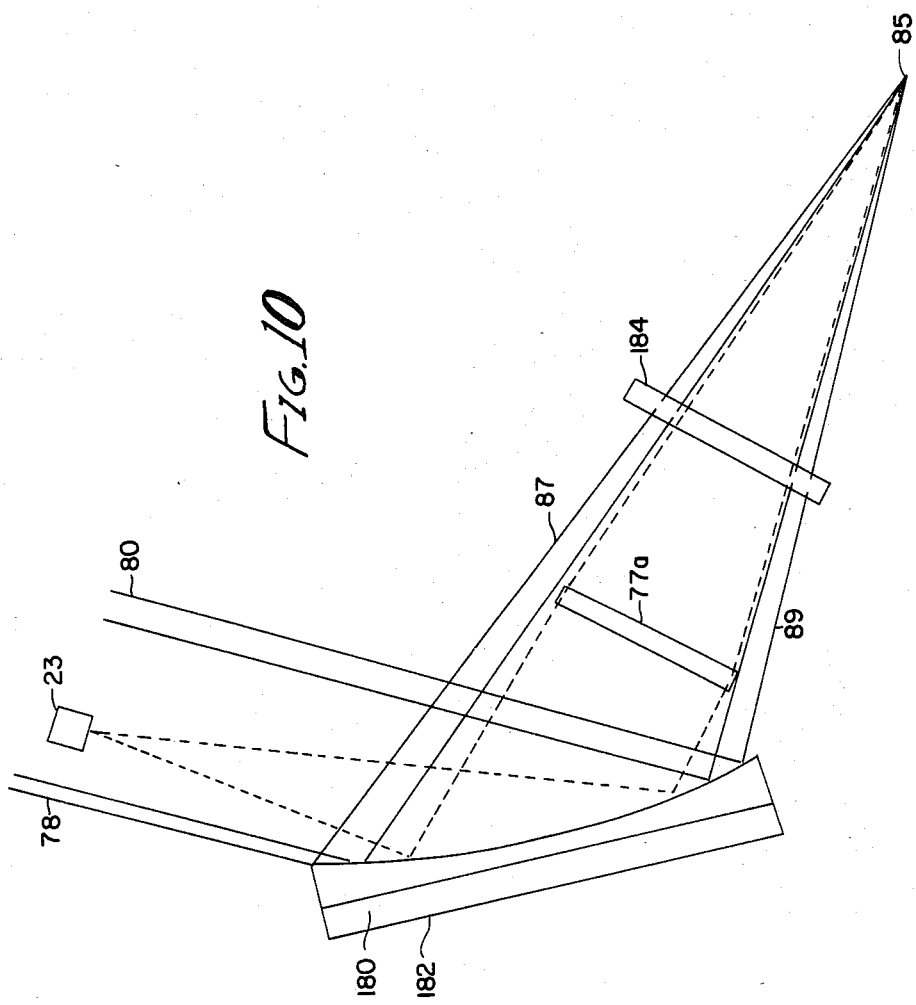

COMPACT RADIATION FRINGE VELOCIMETER FOR MEASURING IN THREE DIMENSIONS

TECHNICAL FIELD

The invention relates generally to the field of air data measurement systems and more particularly to a measurement device which utilizes radiation to create three-dimensional patterns of fringes at a sample location physically removed from the device for the purpose of measuring the velocity of aerosol particles at that location as a function of radiation scattered back to the device.

CROSS-REFERENCE TO RELATED APPLICATIONS

Commonly assigned co-pending U.S. patent application, Ser. No. 328,476, filed Dec. 8, 1981, entitled "Fluorescent Air Data Measurement Device" discloses a unique apparatus and method for measuring air density related parameters associated with the operations of an aircraft. The teachings of that application and the present application may be combined so as to result in an aircraft flight parameter measurement system that advantageously exploits the features and benefits of both inventions. Accordingly, the disclosure and the teachings of said co-pending application are hereby incorporated by reference the same as if fully set out hereat.

BACKGROUND ART

It has long been conventional to measure the relative air speed between a moving object, such as an aircraft, and the free airstream through which the aircraft is flying by means of a mechanical instrument which in effect compares the kinetic pressure exerted by the moving airstream onto a first defined area facing said airstream with respect to the static pressure exerted on a second defined area generally perpendicular to said first defined area. Typically, such a prior art system employs Pitot tubes, pneumatic tubing and pressure transducers which are exposed to the external environment and subject to not only degraded performance caused by calibration changes, but also catastrophic failures as a result of accidental breakage. Furthermore, such a prior art type of airspeed measurement device physically protrudes into the airflow, with a resultant drag penalty.

An example of another type of basically mechanical airspeed measurement device may be mentioned, namely, the cup anemometer wherein a plurality of cups are mounted at the periphery of a rotating carrier such that successive cups catch the wind as the carrier rotates. The carrier is connected by means of a transmission to an electric generator or other suitable tachometer device. The faster the wind's velocity, the greater the force exerted upon the individual cups and the faster the carrier rotates.

The atmosphere contains many naturally occurring aerosols having a diameter on the order of from 0.1 to 10 micrometers. Examples of such aerosols are pollen and dust that naturally occur in the atmosphere. These aerosols tend to follow the motion of the atmosphere in which they are entrained and hence by observing the motion of such particles, it is possible to measure the velocity of the surrounding airstream.

Accordingly, optical techniques have also been utilized to measure wind. One such technique employed scattered sunlight as a source and cross-correlated the outputs of two radiometers having intersecting fields of view. Against localized flumes, such as the flume from a smokestack, it produced satisfactory results. A more sophisticated type of optical device measured the Doppler shift in light scattered by particles within the moving fluid to measure velocity along the system's optical axis.

There has also been used a so-called fringe laser velocimeter which measured a velocity component transverse to the instruments's line of sight by detecting the movement of aerosol particles through a layered pattern of interference fringes created by two intersecting beams of coherent laser light. Such a device has proven particularly accurate at relatively close ranges.

Another optical technique relied upon variations in refractive index moving with the wind across the line of sight of the instrument requiring a so-called double-ended system having a separate source and receiver.

If it is required to measure relative wind speeds in three dimensions, it would theoretically be sufficient to provide three separate systems with mutually orthogonal axes aimed at a common region of space. In practice, such an arrangement is extremely difficult to maintain in alignement and expensive to implement.

It has also been proposed to utilize simultaneously two dominant colors from a single laser to form two mutually orthogonal sets of fringe planes in a common detection volume but, nevertheless, readily distinguishable from each other so that it would be possible to measure two orthogonal velocity components in the plane transverse to the velocimeter's optical axis. Alternatively, polarization or modulation by means of acoustic-optic modulators may be utilized to distinguish the signals corresponding to the two components. It has also been proposed to combine two different types of velocimeters in the same system, so that two orthogonal velocity components may be measured simultaneously, one parallel to the system's main axis (by the Doppler method), and one, at right angles thereto (using the fringe method); by also using the above-mentioned two component techniques it would thus also theoretically be possible to measure simultaneously three orthogonal velocity components (one by the Doppler technique, two with the fringe method).

As examples of prior art devices employing some of the measurement techniques briefly described above, mention may be made of U.S. Pat. No. 3,744,910 entitled "Apparatus for Optical Investigations and Measurements with the Aid of Several Coherent Light Beams"; U.S. Pat. No. 3,915,572 entitled "Combined Dual Scatter, Local Oscillator Laser Doppler Velocimeter"; U.S. Pat. No. 3,966,324 entitled "Laser Doppler Anemometer"; U.S. Pat. No. 3,984,685 entitled "Wind Measurement System"; U.S. Pat. No. 4,148,585 entitled "Three-Dimensional Laser Doppler Velocimeter"; U.S. Pat. No. 4,167,329 entitled "Focussed Doppler Radar"; U.S. Pat. No. 4,168,906 entitled "Differential Doppler Velocity Sensor"; and U.S. Pat. No. 4,179,218 entitled "Particle Size Analyzer."

Other types of velocimeters are described in an article entitled "Laser Doppler Velocimeter Detection Systems for Gas Velocity Measurements" by R. M. Huffaker, appearing in Applied Optics for May 1970; in a paper entitled "A Laser Velocimeter System" by C. A. Greated et al., presented at the Electro-Optics '71 International Conference held in Brighton, England in March 1971 and published by Industrial and Scientific Conference Management Inc. of Chicago, Ill.; in a publication entitled "Laser Instrumentation for Field Flow Diagnostics" by J. D. Trolinger, published by the North Atlantic Treaty Organization Advisory Group for Aerospace Research and Development as Agardograph No. 186, dated March 1974; in an article entitled "Three-Component Optical Doppler Anemometer" by V. M. Kulybin appearing at pages 1425 et seq. of the Soviet Physics Journal for October 1975; in an anonymous Disclosure No. 14125 entitled "Holographic Velocimeter" contained in Research Disclosure for January 1976 published by Industrial Opportunities, Ltd. of Homewell, England; in an article entitled "A Laser Doppler Velocimeter which Measures the Three Components of Velocity" by R. N. Dubnistchev et al. appearing at page 129 et seq. of Optics and Laser Technology for June 1976; in an article entitled "Laser Velocimeter for Wind Tunnel Measurements" by A. Boutier et al., appearing at pages 441 et seq. of IEEE Transactions on Aerospace and Electronics Systems for May 1978; in United Kingdom Patent Specification No. 1,524,830 entitled "Improvements Relating to Flow Measurement Apparatus" and dated Septemeber 1978; in an article entitled "New 3-D Laser Doppler Velocimeter Using Cross-Bispectral Analysis," by Takuso Sato et al. appearing at page 3890 et seq. of Applied Optics for 15 December 1978; and in an article entitled "Atmospheric Laser Doppler Velocimetry: An Overview" by J. W. Bilbro, appearing at page 4 et seq. of Optical Engineering for July/August 1980.

However, taken as a whole, the known prior art does not teach or suggest how the above-mentioned optical and other related techniques may be utilized to provide a compact radiation fringe velocimeter for measuring in three dimensions. To the contrary, the known prior art suggest that at least one velocity component—that parallel to the velocimeter's main axis—should be measured by the above-described Doppler method which requires that a coherency of the radiation be maintained even after it has been scattered back towards the velocimeter, where it still must be combined with unscattered light from a referenced source related in frequency and coherency to the radiation impinging upon the object, thus requiring a radiation source that is coherent and which is capable of maintaining such coherency over relatively long distances. However, the know devices which satisfy such a criterion employ a $CO_2$ laser having a relatively long wavelength that is not optimal for the relatively small aerosol particles that are naturally found in the earth's atmosphere.

Furthermore, such known prior art does not teach or suggest the considerable improvement in signal-to-noise ratio that results from utilizing a single transmit/receive lens window to focus on a single detection volume containing three sets of fringe planes oriented with respect to one another such that no two of their three respective normal vectors are either coplanar nor orthogonal with respect to each other while at the same time each of the three normal vectors has a significant component in the direction of the system's main axis as well as a transverse component at right angles thereto. In particular, it is not seen how the average artisan could construct an optical velocimeter device that would measure the velocity of aerosol particles or other scattering centers in the free airstream at a location spaced apart from the surface of the aircraft and thus for the most part free from any associated turbulence effects, etc. and which, nevertheless, could be constructed in a relatively compact fashion utilizing, if desired, a single viewing window or lens.

Accordingly, it is a general object of the present invention to provide a compact radiation fringe velocimeter for measuring in three dimensions that is adaptable to use aboard an aircraft. It is the related object to provide such a device which creates three sets of radiation fringe plane patterns at varying observation points that is sufficiently remote from the components of the device that the velocimeter may be fully contained within the aircraft and yet the velocity of aerosol particles or other scattering centers in the free airstream are essentially undisturbed by compression and other effects resulting from the passage of the aircraft through the airstream.

It is another related object to provide a velocimeter utilizing optical techniques such as the creation of radiation fringes at the sample location to measure aircraft flight parameters such as true airspeed, angle of attack, and side slip angle efficiently and accurately.

The teachings and disclosures contained in the above-referenced U.S. patents and the information provided by the other above-referenced publications may contribute to a better understanding of the background of the present invention, as well as of its scope, function and possible manners of implementation and use; accordingly, they are hereby incorporated in their entirety by reference the same as if fully set out herein.

DISCLOSURE OF INVENTION

A uniquely configured radiation fringe velocimeter is used to measure all three components of velocity remotely from a single point. The device is particularly intended for utilization aboard an aircraft, in which case the velocity being measured may be that of aerosol particles or other scattering centers in the free airstream at a location spaced apart from the surface of the aircraft and thus for the most part, free from any associated turbulence effects, etc. The device utilizes known optical techniques for splitting and modulating coherent light into three beam pairs focused onto a common detection volume such that three sets of three-dimensional fringe plane patterns are formed at the detection volume, each of the three sets being aligned along a different fringe plane normal vector and moving in the direction of the corresponding fringe plane normal vector at a different predetermined apparent velocity and/or fringe spacing whereby each of the three different sets of fringe patterns will modulate the intensity of the radiation scattered by an aerosol particle at a fixed location within the detection volume with a characteristic modulation frequency. Accordingly, any relative motion of such an aersol particle with respect to the velocimeter apparatus having a component in the direction of a particular one of the three fringe plane normal vectors will cause an apparent shift in the modulation frequency of the scattered light associated with that particular set of fringe planes from which the magnitude and direction of the aerosol particle's velocity component may be calculated.

The beams are oriented with respect to one another at the detection volume such that the three normal vectors associated with the three sets of fringe planes do not all lie on the same plane; accordingly, the three corresponding velocity components may be transformed into any desired system of three-dimensional coordinates. The three components measured may thus be readily transformed into true airspeed, angle of attack and angle of slide slip.

The preferred embodiment transmits all three beam pairs and receives the backscattered radiation through a single transmit/receive lens which permits the velocimeter to be contained within a compact package. No external devices need protrude from the surface of the aircraft and the sample region being measured may be located at a suitable distance from the surface of the airplane. It is adaptable for many applications beyond the capability of the prior art because the three sets of fringe planes need not be mutually perpendicular to one another and because the coherency of the light need not be maintained once it has been scattered by the particles in the detection volume.

BRIEF DESCRIPTION OF DRAWINGS

FIG. 6 is an idealized representation of the intensity of the backscattered light from a particle passing through a set of fringe planes such as are illustrated in FIG. 4 and 5;

FIG. 7 is a isometric exploded representation of a second alternate embodiment of a radiation fringe velocimeter device constructed in accordance with the present invention showing those components which significantly differ in construction function and/or location from the various components shown in FIGS. 1 and 2;

FIG. 8 is a side cross-sectional view of the transmit/receive lens shown in FIG. 7 to which some additional constructional details have been added and also shows the geometrical relationship between the various beams and the corresponding fringe plane normal vectors;

FIG. 9 is a block schematic diagram of the components of a signal processing subsystem such as would be utilized to convert the velocimeter's output to corresponding data required in the operation of an aircraft;

and FIG. 10 is a plan representation of a third alternate embodiment of a radiation fringe velocimeter device showing the use of a concave reflecting surface.

BEST MODES FOR CARRYING OUT THE INVENTION

Figure 1:
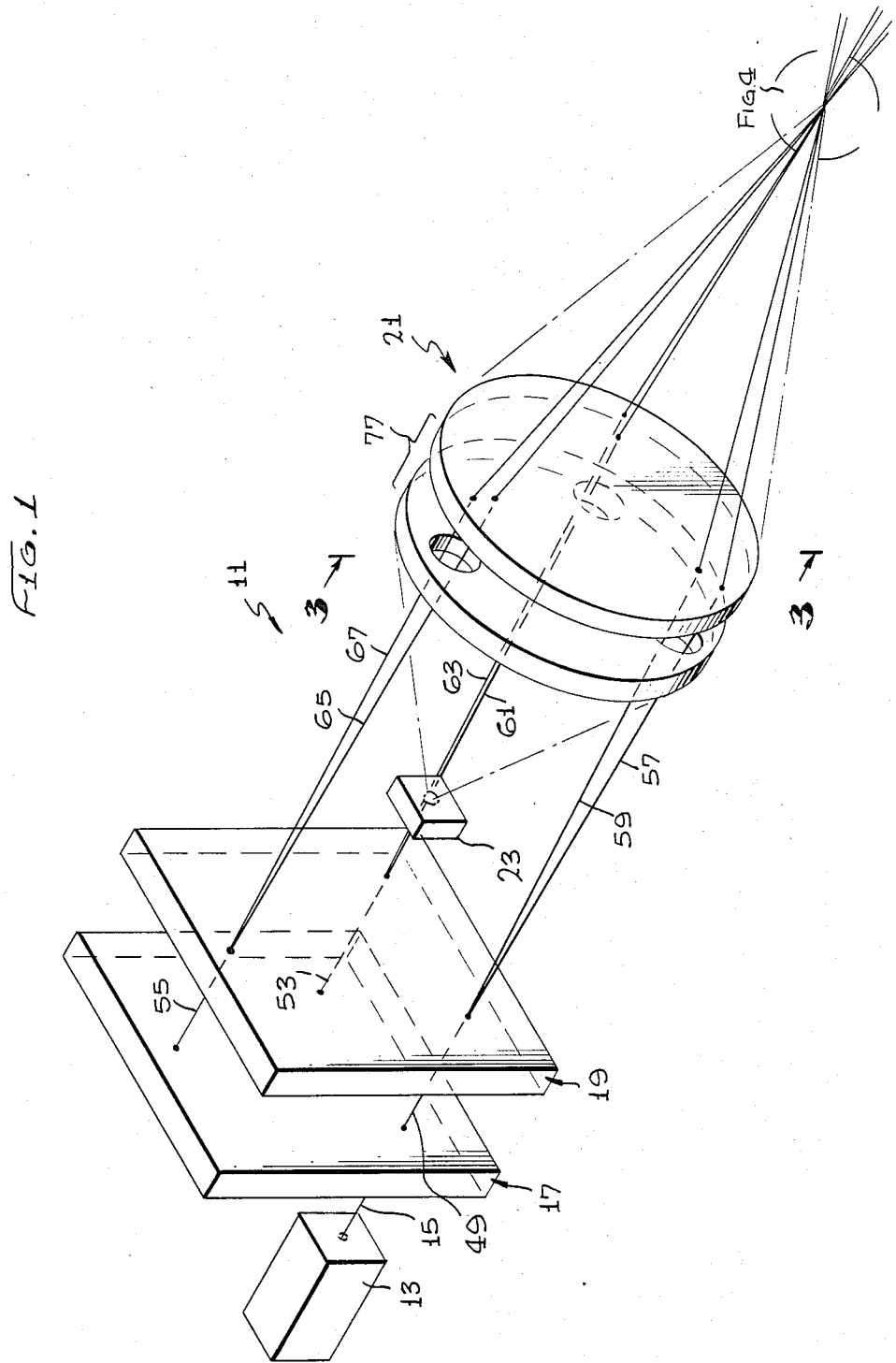
FIG. 1 uses an exploded isometric schematic diagram showing the major components of a first embodiment of a radiation fringe velocimeter device constructed in accordance with the present invention and their relationships to one another and with the location of the region in which the velocity measurement is being made.

Referring now to FIG. 1, there is shown a first embodiment of a compact radiation fringe velocimeter system (11) of the present invention. The system (11) as shown comprises a high intensity light source (13) of coherent monofrequency radiation (e.g., a primary light beam (15) produced by a laser operated in single-line mode), a beam splitting device (17) for generating a first plurality of radiation beams, a modulating device (19) for generating from said first plurality of beams a second plurality of beams each having a distinguishing characteristic, a focusing device (21) for forming separately identifiable three sets of non-orthogonal, but linearly independent, three-dimensional patterns of fringe planes, and a detector device (23).

Figure 2:
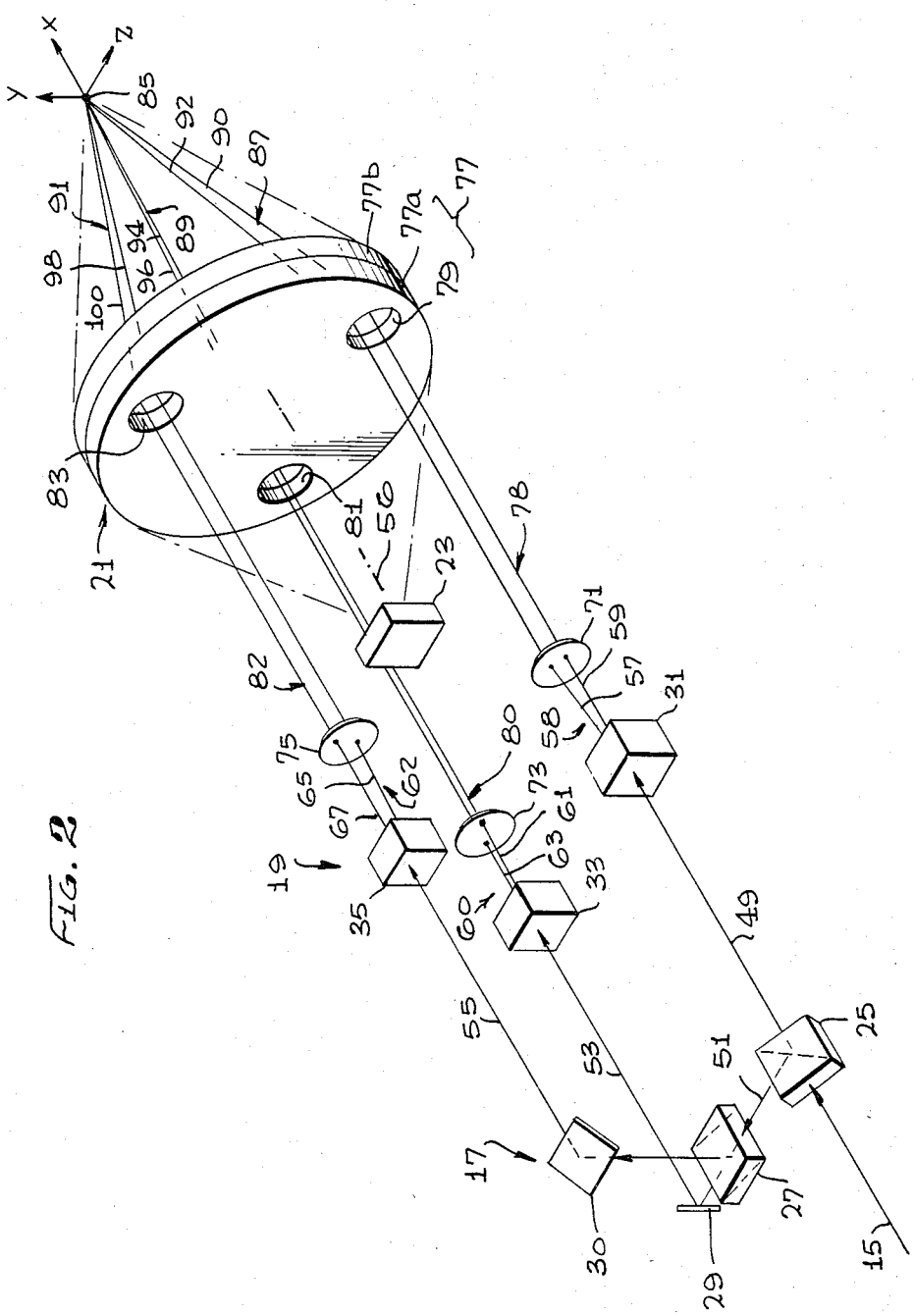
FIG. 2 shows an alternate embodiment generally similar to that of FIG. 1, but showing the various components to the rear of the transmit/receive lens in somewhat more detail.

As shown in FIG. 2, the beam splitting device (17) comprises a beam splitting plate (25), a beam splitting cube (27), and two tilting mirrors (29, 30); the modulating device (19) comprises three acousto-optic ("Bragg") cells (31, 33, 35). The primary light beam (15), which in the case of the illustrated embodiment may be a coherent monofrequency light beam generated by the laser (13), is split by the plate beamsplitter (25) such that approximately thirty percent of the beam is transmitted therethrough as a first secondary beam (49), and seventy percent is reflected therefrom as an intermediate beam (51). Intermediate beam (51) is then split by the cube beamsplitter (27) such that approximately fifty percent of the beam (hence, thirty-five percent of primary beam (15)) is transmitted therethrough as a second secondary beam (53), and fifty percent is reflected by beamsplitter (27) and mirror (30) as a third secondary beam (55). The secondary beams (49, 53, 55) are of substantially equal intensity and are arranged more or less parallel to one another and spaced at approximately equal angular intervals about, and at approximately equal radial distances from, a central axis (56). The first secondary beam (49) impinges on the first acousto-optic cell (31) at the so-called "Bragg angle" $\theta_B$ for that cell determined in accordance with the equation $$\theta_B = \sin^{-1}(\lambda/2S) \quad (1)$$

where $\lambda$ is the wavelength of the entry beam and $S$ is the wavelength of the acoustic waves within the cell. As the first, second and third secondary light beam (49, 53, 55) of the illustrated embodiment originate from a common source and thus all have the same frequency and wavelength, it will be seen that the Bragg angle associated with each of the three acousto-optic modulating cells (31, 33, 35) will depend only upon the particular respective modulating frequency chosen. The effect of the acoustic waves in the deflection medium inside each of the cells (31, 33, 35) is to set up a phase diffraction grating moving with the velocity of sound within the medium and having a grating spacing equal to the sound wavelength. Since the incoming beam enters the cell at the Bragg angle, a substantial percentage of the beam is diffracted from the exit side of the cell in a first order diffracted beam that is deflected from the incident light beam by an angle $-2\theta_B$. This deflected beam is subjected to a slight frequency displacement $\Delta f$ as a result of a Doppler effect occasioned by the movement relative to the moving acoustic wave front; the deflected beam is also phase modulated in accordance with the frequency and amplitude of the sound wave. "Bragg diffraction" is discussed in further detail in an article entitled "Elasto-Optic Light Modulation and Deflection" by E. K. Sittig appearing at pages 229 et seq. of Progree in Optics, Vol. 9, published in 1952 by North-Holland Publishing Company-Amsterdam, which discussion is incorporated herein by reference. Second acousto-optic cell (33) and third acousto-optic cell (35) perform similar functions with respect to the second secondary beam (53) and the third secondary beam (55). However, each of the three cells (31, 33, 35) is driven at a different characteristic frequency; accordingly, each cell has its own individual Bragg angle ($\theta_B$, $\theta_B'$, $\theta_B''$) at which the incoming light beam should enter. As shown in FIG. 2, in addition to the three diffracted beams (57, 61, 65) exiting from the three respective Bragg cells (31, 33, 35), three respective undeflected beams (59, 63, 67) are also present. These three undeflected beams represent the portion of the respective incoming beams (49, 53, 55) that were not diffracted (and modulated in frequency and phase) by the corresponding respective Bragg cells (31, 33, 35).

Thus, it will be seen that, in response to application of the three secondary beams (49, 53, 55) at the three appropriate respective Bragg angles ($\theta_B$, $\theta_B'$, $\theta_B''$) associated with each of the three acoustic-optic cells (31, 33, 35) and the different characteristic modulating frequencies associated therewith, the three cells produce three beam pairs (58, 60, 62), each pair having a substantially unshifted beam (59, 63, 67) (i.e., a zero order diffraction) and a modulated beam (57, 61, 65) (the above-mentioned deflected beams). In an exemplary embodiment, acoustic frequencies for the three cells were respectively 30 MHz, 55 MHz and 85 MHZ.

The third acousto-optic cell (35) is oriented vertically such that its sound waves are parallel to the X—Z plane. This causes the plane containing the two diverging beams (65, 67) of third beam pair (62) to be oriented vertically (i.e., in the X—Y plane). The other two cells (31, 33) are oriented so that the planes containing the first pair of beams (57, 59) and the second pair of beams (61, 63) subtend angles of −120° and +120°, respectively, with respect to the vertical (X—Y) plane. (See also FIG. 3.)

It will be appreciated that the individual beams could be modulated in a similar fashion by means of rotating diffraction gratings or the like. However, it should be understood that acousto-optic cells are normally preferable since they are more compact and require a minimum of maintenance.

Figure 3:
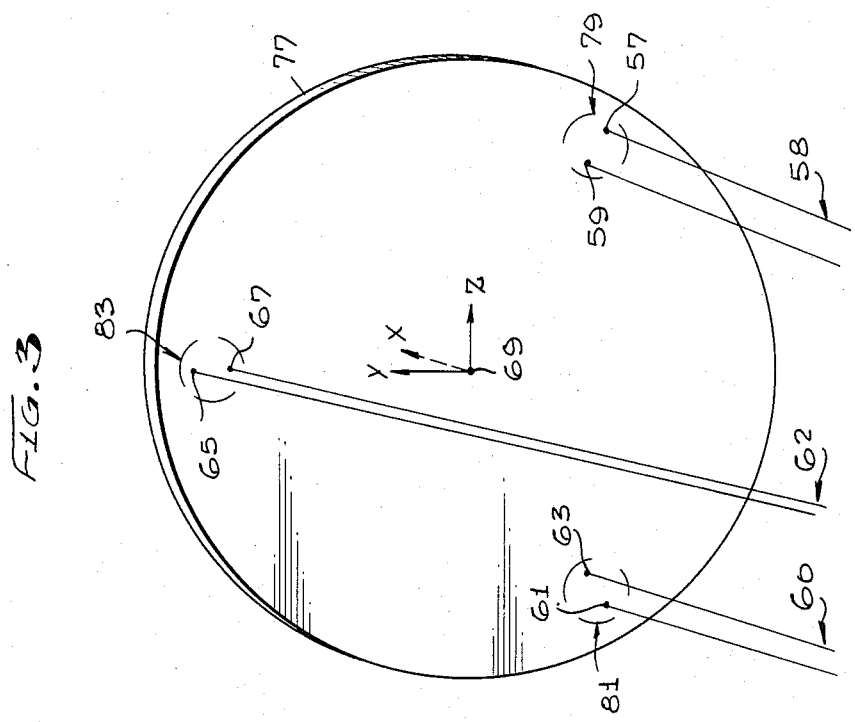
FIG. 3 shows the rear surface of the transmit/receive lens of FIG. 1.

As shown in FIGS. 2 and 3, while being directed generally toward the lens system (21), the shifted beams (57, 61, 65) of the three beam pairs (58, 60, 62) diverge slightly radially outward from the center (69) of the lens system (21), while the unshifted beams (59, 63, 67) diverge slightly radially inward toward the center (69). Thereupon, as also shown in FIG. 2, three individual collimating lenses (71, 73, 75) collimate the beams of each diverging beam pair (58, 60, 62) to produce collimated beam pairs (78, 80, 82), and direct the collimated beam pairs to a transmit/receive lens (77). The collimated beam pairs (78, 80, 82) are then focused by three respective individual lens segments (79, 81, 83) integrally formed in the transmit/receive lens (77) at the three locations surrounding the respective intersections of said collimated beam pairs with the surface of said lens. These three individual segments have an effective focal length somewhat greater than that of the remainder of the lens, and may conveniently be fabricated by forming the lens (77) from two plano-convex lens elements (77a 77b) mounted back-to-back, one of which is provided with cut-outs at the locations corresponding to the three segments (79, 81, 83); alternatively, the three segments (79, 81, 83) may be formed by localized surface grinding on one of the surfaces of the lens (77). These focused beam pairs (87, 89, 91) are accordingly directed onto and intersect at a common detection volume (85) located in front of the lens (77) at a distance determined by the focal length of the three lens segments (79, 81, 83).

Figure 4:
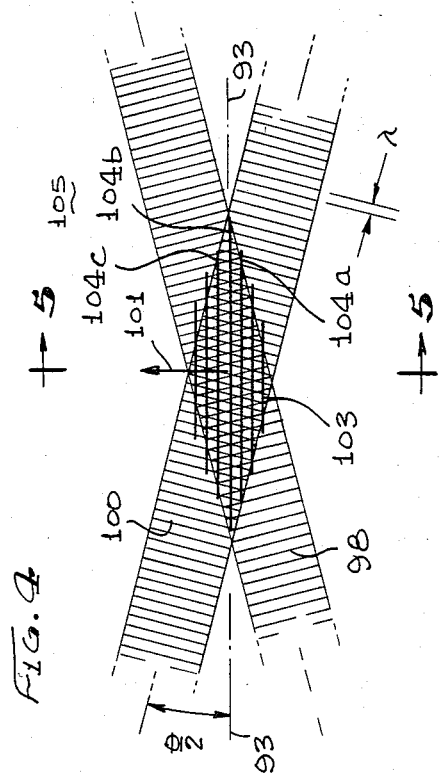
FIG. 4 is a side elevational view of an exemplary pair of intersecting beams of coherent radiation and the interference fringe planes formed at their intersection.
Figure 5:
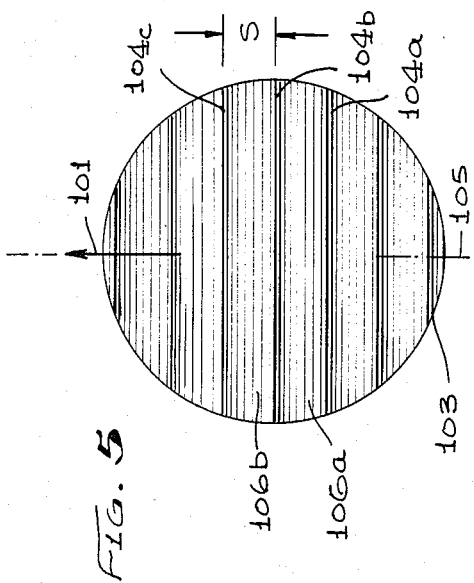
FIG. 5 is a cross-section through the central portion of the set of fringe planes shown in FIG. 4.

When each convergent beam pair (87, 89, 91) is focused at the detection volume (85), it forms a three-dimensional optical fringe pattern in the detection volume as a result of interference between the respective wavefronts. FIG. 4 is a side elevational view of one fringe pattern formed by the intersection of two beams of a convergent pair (e.g., beams (98, 100) of the third convergent pair (91)). Each bright or dark fringe may be said to occur in a fringe plane (e.g., lower fringe plane (103)) disposed generally perpendicular to the plane (e.g., plane (105)) containing the two intersecting beams (98, 100) and generally parallel to the bisector (e.g., bisector (93)) of the angle of intersection ($\theta$) of the beam pair, the orientation of the fringe planes within such a fringe pattern being defined by a so-called fringe plane normal vector (e.g., vector (101)) disposed perpendicular to the fringe planes, as shown in FIGS. 4 and 5. Accordingly, the three beams pairs (87, 89, 91) form three such sets of overlapping three-dimensional fringe patterns, each having its own normal vector.

At this point it may be noted that the illustrated device will function even if the three sets of fringe patterns associated respectively with the three beam pairs (87, 89, 91) do not actually overlap but are merely located in the same general spatial volume so that the transmit/receive lens (77) may still gather light from all three sets of fringe patterns onto a single detector (23). However, when all three sets of fringe patterns overlap one another, there is a greater probability of measuring all three linearly independent components of the velocity of a single aerosol particle, since any particle having an effective cross section larger than the wavelength of the incident radiation will scatter at least some light back to the detector (23) from each of the three sets of fringe patterns.

A typical variation in magnitude of scatter intensity as an aerosol particle moves relative to such layers of bright and dark fringe planes is shown in FIG. 6. Peaks (105a, 105b, 105c) correspond to maximum scatter at the central bright fringe regions (104a, 104b, 104c) (FIG. 4) and the troughs (107a, 107b) correspond to substantially no scatter at the corresponding dark fringe regions (106a, 106b) (FIG. 5).

Although, as discussed in further detail hereinafter with particular reference to FIG. 9, it is a relatively simple matter to separate the single signal output by the detector (23) into three separate signals each associated with a particular set of fringe plane patterns, it would also be possible, in accordance with the teachings of the above discussed prior art, to utilize different colors and/or polarization modes to identify the data associated with each of the three components. However, in that event it will be necessary to provide three separate detectors (23) each sensitive to one component, with the result that only a fraction of the backscattered radiation gathered by transmit/receive lens (77) will impinge on any one of the three detectors.

Those skilled in the art will recognize that it would also be possible, in the event that the three sets of patterns of fringe planes are spatially separated from one another, to focus the respective three sets of backscattered radiation on three respective spatially separated detection areas, each provided with its own detector. However, such an arrangement would have a significant disadvantage over the preferred embodiment described in detail herein, namely, increased mechanical complexity and sensitivity to alignment errors.

FIG. 7 shows an alternative embodiment to that described above with particular reference to FIGS. 1 and 2. In this alternative embodiment, the collimating lenses (71, 73, 75) are omitted and a single, unshifted reference beam directed along the central axis 56 replaces the three unshifted beams (59, 63, 67) of the three divergent beam pairs (58, 60, 62). Because this reference beam occupies the central axis of the optical system, the photodetector (23') is located to one side and a focusing reflector (109) provided with a central transparent opening (110) is utilized to direct the scattered radiation received through the receive/transmit lens (77') back onto the off axis photodetector (23').

The transmit/receive lens (77') of the FIG. 7 embodiment may be substantially the same as described above with respect to the FIG. 1 embodiment, or alternatively, it may be constructed as shown in cross section in FIG. 8. It will be noted that in FIG. 8 the outer surface of the lens (77") is essentially flat and its inner surface (i.e., the surface oriented towards the laser (13) and the photodetector (23)) is convex. Towards the periphery of the lens and spaced apart from one another at approximate 120° intervals corresponding to the orientation of the three respective diffracted output beams (57, 61, 65) of the three acousto-optic cells (31, 33, 35) are provided three respective recessed optical surfaces (125) spaced inwardly from the lens' front surface (117) by means of a recessed area (111). Each of the three recessed areas is in fluid communication with the aircraft's pressurized interior region (123) by means of a constricted vent (121). The purpose of this vent (121) is to provide a constant flow of air onto the optical surface (125) so as to ensure that this optically critical area remains free of ice, condensed water vapor or other particulate matter which could adversely affect the coherent nature of the radiation beams utilized to form the three respective patterns of fringe planes at the detection volume (85). It will be noted that a fourth recessed area (127) and fourth vent (129) are also provided at the center of the lens. It should be understood that similar self-cleaning recessed optical areas could also be provided in the vicinity of lens segments (79, 81, 83) in the embodiment shown in FIGS. 1 and 2. Because that embodiment utilizes three separate pairs of beams, the recessed areas might each have to be somewhat larger but, because there is no central beam, there would be no need for a fourth centrally located recessed area.

The other areas of the lens (77") are not as critical as the areas (125, 127) through which pass the laser beams, since the photodetector (23') is responsive only to the intensity of the backscattered radiation received from detection volume (85), and not to any modulation in phase or coherency.

At this point it should be emphasized that although a transmit/receive lens is shown as being the means for projecting the three sets of fringe plane patterns onto the detection volume and for focusing the backscattered radiation from the detection volume onto the detection area, it would be a simple matter well within the level of skill of the average artisan to substitute other functionally equivalent means for projecting and/or focusing, such as a concave reflective surface 180 of optical quality formed on the front of a suitably shaped support 182. Such a third embodiment of the velocimeter is shown in FIG. 10. In that case the window function of the lens (77) could be satisfied by means of a suitable thickness of a transparent material 184, possibly provided with self-cleaning segments analogous to the above-described recess (125) and air vents (121) at those portions of the window through which the coherent beams are projected.

It should be borne in mind that the above-described embodiments have an advantageous self-aligning characteristic even if the transmit/receive lens assembly (77) is mounted independently of the other components, thereby permitting the transmit/receive lens to be rigidly flush-mounted in the skin of the airplane, while permitting the other components contained inside the aircraft to be isolated from vibrations and/or to be conveniently removed and replaced for maintenance without disturbing the window and its associated seal.

Especially when the velocimeter utilizes such a flush-mounted window through which is transmitted the coherent radiation that forms all three sets of the fringe plane patterns, and through which also is received all of the backscattered radiation from the detection volume containing the fringe plane patterns, it will be appreciated that it is preferable (on account of strength, cost, weight, ease of replacement, and other similar considerations) for the window to have a maximum diameter (or other equivalent effective aperture dimension) that is relatively small. In particular, it is essential that the distance that separates the detection volume from the window and the rest of the aircraft's surface be significantly greater than the thickness of the boundary layer formed at the surface of the aircraft. For most applications it is desirable that the distance separating the detection volume from the surface of the aircraft be at least 0.5 meters and preferably in excess of 1 meter. On the other hand, for most applications, the maximum practical window size is less than 0.5 meters. Thus, as a general rule, the effective window aperture dimension should be less than the distance between the window and the sample.

As indicated in FIG. 7 and shown in more detail in FIG. 8, the attitude or position of the three bisectors (e.g., upper bisector (93)) and of the three planes (e.g. vertical plane (105)), respectively, containing the three beam pairs are selected such that the three corresponding fringe normal vectors (e.g., vector (101)) are disposed non-orthogonal with respect to each other and are linearly independent of one another (i.e., all three normal vectors do not lie on a common plane). Accordingly, as suggested in FIGS. 4, 5 and 6, when a small physical object (such as a particle of dust or similar aerosol) traverses the three sets of fringe patterns formed by the three beam pairs, a velocity component of the object may be measured in the direction of each of the three fringe normal vectors providing a set of three (non-orthogonal) velocity components in three dimensions. Thus, a velocity component produces by each beam pair may be measured perpendicular to the bisector of the angle subtended by, and in the plane containing, the beams of the pair (i.e., measured along the normal to the interference pattern fringe planes formed by that beam pair).

More particularly, as the aerosol particle traverses the bright and dark fringes of each of the three sets of fringe patterns, light from the lens segments (79, 81, 83) forming the fringes become incident upon the entity and is scattered by the entity. As shown in FIG. 2, the scattered light is refocused by the whole of the transmit/receive lens (77) (except for lens segments 79, 81, 83) onto a photodetector (23). In response to the refocused light, the detector (23) provides a processor (not shown) with a composite output signal representing all three non-orthogonal components of the velocity of the entity through the fringes. The processor then separates the signal into the three linearly independent, non-orthogonal velocity components corresponding to the three normal vectors, and then transforms these individual non-orthogonal velocity components to measurements in a desired orthogonal frame of reference, as described below.

As shown in the Drawings (see in particular the right-hand portions of FIGS. 7 and 8), the beam pairs have been selected such that the normal vectors corresponding to each set of interference fringes are non-orthogonal, but are, nevertheless, linearly independent of each other. Consequently, to determine the velocity of an entity which traverses the fringe region with respect to a conventional orthogonal reference system, the non-orthogonal velocity components ($V_A$, $V_B$, $V_C$) must be transformed to the orthogonal reference system. This may be accomplished by a linear transformation process in accordance with the following description. The transformation is performed by the processor (see FIG. 9) in response to an output signal from detector (23), the output signal from detector (23) being representative of shifts in frequency of the scattered light. The frequency shifts, measured with reference to the respective Bragg cell frequencies, provide information about the magnitude of the non-orthogonal velocity components of the entity as it traverses the fringe pattern. For example, the frequency shift occasioned by the velocity of the entity in the direction of the normal to the fringes formed by beam pair (91) is measured with reference to the frequency of Bragg cell (35) (FIG. 2). Similarly, the frequency shifts occasioned by the velocities of the entity in the directions of the normals to the fringes formed by beam pairs (87, 89) (corresponding to optical axes B and C, FIG. 6A) are measured with reference to the frequencies of Bragg cells (31, 33), respectively. It should be noted that by using a different frequency for each of the three cells, and orienting them in such a manner as to create three sets of non-coplanar fringes, a method is established for separating the three component information (e.g., using electronic filters at the output of photodetector (23), each filter centered at one of the cell frequencies).

The magnitudes of the three non-orthogonal velocity components $V_A$, $V_B$, $V_C$ may be found from the measured frequency shifts as follows:

$$V_A = S_A \Delta f_A \quad (2)$$

$$V_B = S_B \Delta f_B \quad (3)$$

$$V_C = S_C \Delta f_C \quad (4)$$

The measured vectors can then be expressed in terms of an orthogonal set of velocity vectors, $\vec{u}$, $\vec{v}$, and $\vec{w}$ by:

$$\vec{V}_A = S_A \Delta f_A \vec{v}_A = a_1 \vec{u} + a_2 \vec{v} + a_3 \vec{w} \quad (5)$$

$$\vec{V}_B = S_B \Delta f_B \vec{v}_B = b_1 \vec{u} + b_2 \vec{v} + b_3 \vec{w} \quad (6)$$

$$\vec{V}_C = S_C \Delta f_C \vec{v}_C = c_1 \vec{u} + c_2 \vec{v} + c_3 \vec{w} \quad (7)$$

where $\vec{v}_A$, $\vec{v}_B$, and $\vec{v}_C$ are unit vectors along the A, B, and C non-orthogonal directions, respectively, as shown, for example, in FIG. 7; and $a_i$, $b_i$, $c_i$ are coefficients determined solely by the optical geometry of the system.

In matrix form, equations (5), (6) and (7) become:

$$\begin{bmatrix} S_A \Delta f_A \vec{v}_A \\ S_B \Delta f_B \vec{v}_B \\ S_C \Delta f_C \vec{v}_C \end{bmatrix} = \begin{bmatrix} a_1 & a_2 & a_3 \\ b_1 & b_2 & b_3 \\ c_1 & c_2 & c_3 \end{bmatrix} \begin{bmatrix} \vec{u} \\ \vec{v} \\ \vec{w} \end{bmatrix} \quad (8)$$

Calling the matrix of transformation coefficients T, the transformation equation can be written as:

$$\begin{bmatrix} S_A \Delta f_A \vec{v}_A \\ S_B \Delta f_B \vec{v}_B \\ S_C \Delta f_C \vec{v}_C \end{bmatrix} = T \begin{bmatrix} \vec{u} \\ \vec{v} \\ \vec{w} \end{bmatrix} \quad (9)$$

Then, by inverting the transformation:

$$\begin{bmatrix} \vec{u} \\ \vec{v} \\ \vec{w} \end{bmatrix} = T^{-1} \begin{bmatrix} S_A \Delta f_A v_A \\ S_B \Delta f_B v_B \\ S_C \Delta f_C v_C \end{bmatrix} \quad (10)$$

Thus, from the foregoing, it is seen that the transformation is valid for all optical geometries for which $T^{-1}$ exists. The elements of matrices T and $T^{-1}$ described above may then be calculated for the particular optical geometry selected, for example, for the geometry shown in FIGS. 7 and 8.

If the orthogonal coordinate system, to which the velocity components are transformed, corresponds to the x-y-z axes of, for example, an aircraft body, other desired velocity-related values may be calculated as described below:

For example, if the velocity components are written as:

$$u = ui; \ v = vj; \text{ and } w = wk \quad (11)$$

where i, j, and k are the unit vectors in the x, y and z directions, respectively, then the true airspeed ($V_T$) of the aircraft may be calculated as follows:

$$V_T = (u^2 + v^2 + w^2)^{\frac{1}{2}} \quad (12)$$

and the angle of attack ($\alpha$) may be calculated as:

$$(\alpha) = \tan^{-1}(v/V_T) \quad (13)$$

Also, the angle of sideslip ($\beta$) may be calculated as:
$$(\beta) = \tan^{-1}(w/V_T) \quad (14)$$

Referring now specifically to FIG. 9, it will be recalled that this Figure is a block diagram depicting schematically the flow of raw data through the various signal processing and conditioning subsystems. The photodetector (23) generates a raw data output signal (120) which corresponds to the variation in intensity of the backscattered light received from sample volume area (85) through the transmit/receive lens (77) (FIG. 2). It will be recalled that each of the three acousto-optic cells (31, 33, 35) had its particular associated acoustic frequency which resulted in each of the three different sets of fringe planes having its own distinguishing modulation frequency that will be imparted to the scattered light as the fringe planes move relative to a "stationary" aerosol particle. Since the three modulating frequencies are selected such that a "moving" particle will still result in the scattered light being modulated at a frequency that still is contained within three frequency bands centered about the three modulation frequencies and since the three modulating frequencies are sufficiently separated from one another that the three associated frequency bands associated with the three sets of fringe planes do not overlap—at least for the range of particle velocities anticipated—it is thus possible to separate the raw output signal (120) (depicted as a single burst of frequencies), by means of three separate conventional band pass filters (122, 124, 126); the raw output signal may thus be divided into a low frequency component (128), a mid-frequency component (130) and a high frequency component (132), respectively corresponding to the fringe planes associated with first normal vector $N_a$, second normal vector $N_b$, and a third normal vector $N_c$. These three signal components are input into three respective channels (134, 136, 138) of a conventional frequency analyzer (140) which processes successive such frequency burst components to derive a corresponding fundamental frequency from the background noise and to output a digital indication thereof to the data processor (142). This is indicated symbolically in the Figure by the provision of a first output (144) labeled $f_a$ from the first channel (134), a second output labeled $f_b$ (146) from the second channel (136), and a third output labeled $f_c$ (148) from the third channel (158).

Preferably, the frequency analyzer (140) is provided with an adaptive tracking capability whereby it concentrates its search for the desired fundamental frequency component about a known or predicted value thereof. This is indicated diagrammatically in the Figure by the provision of three digital signals from the data processor (142) to the frequency analyzer (140) labeled respectively $\hat{f}_a$ (150), $\hat{f}_b$ (152) and $\hat{f}_c$ (154). To derive these three predicted frequencies, the data processor (142) has the benefit of accelerometer data and rate-gyro data from the aircraft's guidance system. This is indicated symbolically in the Figure by the provision of a first set of inputs (156) respectively labeled $N_x$ (158), $N_y$ (160), and $N_z$ (162) which represent digital indications of acceleration in the aircraft's X, Y and Z axes, and by the provision of a second set of similar inputs (164) respectively labeled $R_x$ (166), $R_y$ (168) and $R_z$ (170) corresponding to digital representations of the aircraft's angular velocity about its X, Y and Z axes, respectively. It should be readily apparent, that given the magnitude and orientation of such accelerations and changes in attitude, it then becomes a relatively simple computation to estimate near term changes in the relative velocity between particles in the free airstream located at a particular orientation with respect to and at a particular distance from the aircraft's center of gravity and the resultant increase or decrease in the frequency with which such a particle will interrupt the successive fringes of each of the three sets of moving fringe patterns. In particular, such an estimation may make use of the mathmetical technique known as the "Kalman Filter" whereby such frequency changes may be predicted with reasonable accuracy even when the frequency analyzer is unable to make an accurate measurement of the actual frequency because of a poor signal-to-noise ratio, sudden perturbations in the signal caused by fleeting gusts of wind and the like and by the failure of the photodetector (23) to output any meaningful signal for some interval of time as the result of the temporary absence of any suitable aerosol particles within the actual sample volume.

In any event, the data processor (142) produces three output signals (which may be either analog or digital, or both), identified in the drawings by the symbol V (172), $\alpha$ (174) and $\beta$ (176) respectively corresponding to true airspeed, angle of attack and angle of side slip. As a result of the particular signal processing system design illustrated in the Drawings, the output of the data processor will effectively be a composite of data measured by the fringe velocimeter with data measured by conventional accelerometers and rate gyroscopes. However, it should be appreciated that by so combining directly measured data with predicted data, not only is the system able to overcome the adverse effects of what might otherwise be a poor signal-to-noise environment (especially when an aircraft is flying at very high altitudes and/or a relatively low-powered laser is being utilized to measure velocity of particles at a relatively great distance) but also the cumulative integration errors inherent in an accelerometer-based system are minimized.

While the invention has been described in detail with respect to certain specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

Industrial Applicability

Accordingly, it will be seen that a radiation fringe velocimeter constructed in accordance with the teachings of the present invention may be utilized in many different types of instrumentation systems, such as provided for use aboard an aircraft, in which case air flight data measurements of variables such as airspeed, angle of attack and sideslip angle may be made with enhanced accuracy and reliability.

I claim:

1. Apparatus for measuring the three-dimensional velocity of a remotely located object, comprising:
    first means for producing simultaneously three sets of non-orthogonal, but linearly independent, three-dimensional patterns of radiation, each of said sets having its own distinguishing characteristic and having a normal vector having a significant component in the direction of the main axis of the system as well as a transverse component at right angles thereto;
    second means associated with said first means for projecting said three sets of patterns onto a detection volume, said detection volume being physically separated in space from said apparatus;
    third means associated with said second means for focusing radiation backscattered by said object as it passes through said detection volume onto a detection area contained within said apparatus;
    fourth means disposed in the vicinity of said detection area for measuring the intensity of said backscattered radiation;
    fifth means responsive to the output of said fourth means and capable of utilizing said distinguishable characteristic for identifying three separate components of said backscattered radiation associated respectively with each of said three sets of radiation patterns; and sixth means responsive to the output of said fifth means for calculating the velocity of said object relative to said apparatus, wherein at least said first, second, third and fourth means are located in physical proximity to one another, whereby they may all be contained within a single, relatively compact, housing aboard an aircraft.

2. The velocity measuring apparatus of claim 1 wherein said three sets of three dimensional patterns of radiation actually overlap one another such that radiation scattered from a single particle in said detection volume may contain components originating from each one of said three sets.

3. The velocity measuring apparatus of claim 1 wherein said three sets of three-dimensional patterns of radiation are spatially separated from one another within said detection volume and said distinguishing characteristic associated with at least one of said sets of patterns of radiation is spatial relationship.

4. The velocity measuring apparatus of claims 1 or 2 wherein said first means comprises a polarizing means and said distinguishing characteristics associated with at least one of said sets of patterns of radiation is a particular mode of polarization and said fifth means comprises a polarizing filter means sensitive to said particular polarization mode.

5. The velocity measuring apparatus of claims 1 or 2 wherein said distinguishing characteristic associated with at least one of said sets of patterns of radiation is the wavelength of the radiation and wherein said fifth means comprises a filter means sensitive to said wavelength.

6. The velocity measuring apparatus of claim 1 wherein each of said three-dimensional patterns of radiation is a set of fringe planes each oriented generally perpendicularly with respect to a fringe plane normal vector, each of said sets of fringe planes being formed in the volume defined by the intersection of two distinct beams of radiation and having a corresponding normal vector generally coplanar with said two intersecting beams and generally perpendicular to the bisector of their angle of their intersection.

7. The velocity measuring apparatus of claim 1 wherein said beams are beams of laser radiation.

8. The velocity measuring apparatus of claims 6 or 7 further comprising:

means for modulating one of said beams with respect to a second one of said beams such that the corresponding one of said fringe plane patterns formed by those two beams within said detection volume will have an apparent relative velocity with respect to said apparatus determined by the nature and extent of the modulation.

9. The velocity measuring apparatus of claim 7 further comprising:

means for splitting a single beam of laser light into a beam pair.

10. The velocity measuring apparatus of claim 9 further comprising:

an acousto-optic modulating means driven at a predetermined frequency such that when the two beams comprised in said beam pairs intersect, the fringe plane patterns formed thereby will move in a direction generally normal to the planes of said fringes with a velocity related to said predetermined frequency, thereby modulating the one of said three separate velocity components associated with the corresponding one of said three fringe planes with a characteristic frequency related to said predetermined frequency whereby said particular component can be distinguished from the other two components of said three separate components.

11. The velocity measuring apparatus of claims 1 or 2 wherein said distinguishing characteristic associated with at least one of said sets of patterns of radiation is the rate which an object that is stationary relative to said apparatus will intersect successive bright regions within a corresponding one of said three-dimensional patterns of radiation, thereby modulating the radiation backscattered by an object from said corresponding pattern of radiation with a frequency related to said rate and also related to a relative velocity component of the object.

12. The velocity measuring apparatus of claim 1 wherein said second means and said third means comprise:

a transmit/receive window in an exterior surface of said aircraft through which is transmitted radiation originating with said first means contained inside said apparatus to said detection volume outside said apparatus and through which also is received backscattered radiation from said detection volume, said window having an effective aperture dimension significantly less than the distance separating said common detection volume from said lens window.

13. The velocity measuring apparatus of claim 12 wherein said transmit/receive window is a lens.

14. The velocity measuring apparatus of claim 12 wherein said window comprises a transparent body having front and rear surfaces generally parallel to one another.

15. The velocity measuring apparatus of claim 12 wherein said window has a maximum transverse dimension of 0.5 meter and wherein said distance separating said detection volume is in excess of 1 meter.

16. The velocity measuring apparatus of claims 1 or 12 wherein said apparatus is mounted aboard an aircraft flying through the air and wherein the apparent velocity of said fringe planes caused by said modulation is significantly in excess of the velocity of said aircraft relative to said air whereby the relative velocity of said aircraft with respect to said airstream will cause an apparent shift in said modulation frequency from which said relative velocity component may be calculated.

17. The velocity measuring apparatus of claims 1 or 12 wherein said second means and said third means comprise a common optical element that is operative both in the path of said radiation projected by said second means onto said detection volume and in the path of the radiation from said detection volume that is focused by said third means.

18. The velocity measuring apparatus of claim 17 wherein said common optical element is a lens.

19. The velocity measuring apparatus of claim 17 wherein said common optical element is a concave mirror.

* * * * *